US011985475B2

(12) United States Patent
Strunk

(10) Patent No.: US 11,985,475 B2
(45) Date of Patent: May 14, 2024

(54) AUDIO LOUDSPEAKER ARRAY AND RELATED METHODS

(71) Applicant: Endow Audio, LLC, Georgetown, KY (US)

(72) Inventor: David T. Strunk, Georgetown, KY (US)

(73) Assignee: Endow Audio, LLC, Georgetown, KY (US)

( * ) Notice: Subject to any disclaimer, the term of this patent is extended or adjusted under 35 U.S.C. 154(b) by 0 days.

(21) Appl. No.: 17/505,157

(22) Filed: Oct. 19, 2021

(65) Prior Publication Data

US 2022/0124432 A1 Apr. 21, 2022

Related U.S. Application Data

(60) Provisional application No. 63/093,451, filed on Oct. 19, 2020.

(51) Int. Cl.
*H04R 1/02* (2006.01)
*H04R 1/26* (2006.01)
(Continued)

(52) U.S. Cl.
CPC ............... *H04R 1/26* (2013.01); *H04R 1/025* (2013.01); *H04R 1/403* (2013.01); *H04R 3/12* (2013.01);
(Continued)

(58) Field of Classification Search
CPC . H04R 1/26; H04R 1/025; H04R 3/12; H04R 2201/401; H04R 2400/11
(Continued)

(56) References Cited

U.S. PATENT DOCUMENTS

| | | | | |
|---|---|---|---|---|
| 2,602,860 A | | 7/1952 | Stewart | |
| 3,931,867 A | * | 1/1976 | Janszen .................... | H04R 1/24 381/186 |

(Continued)

FOREIGN PATENT DOCUMENTS

| | | |
|---|---|---|
| EP | 2692144 B1 | 2/2017 |
| JP | 4513765 B2 | 7/2010 |
| KR | 100836662 B1 | 6/2008 |

OTHER PUBLICATIONS

JBL Professional, "CBT Constant Beamwidth Technology" TN V.1 No.35 Oct. 2009, https://www.jblpro.com/ProductAttachments/CBT_Tech_Note_Vol1No35_091007.pdf.

(Continued)

*Primary Examiner* — Disler Paul
(74) *Attorney, Agent, or Firm* — Michael S. Hargis; Stites & Harbison PLLC

(57) ABSTRACT

An audio speaker for projecting sound into a listening space having an on-axis includes a frame supporting at least two drivers radially arrayed in a plane substantially perpendicular to the on-axis. The at least two drivers may be electrically connected to operate in common acoustic phase, substantially the same size, mid-range drivers, and/or may include at least one rearward facing driver. The audio speaker may also include an on-axis driver, or an inner driver positioned substantially at a point where a first line drawn perpendicularly through a face of a first driver of the at least two drivers and a second line drawn perpendicularly through a face of a second driver of the at least two drivers converge. The inner driver may be a high frequency driver, for example, a tweeter, and a face of the inner driver may be substantially perpendicular to the on-axis.

33 Claims, 8 Drawing Sheets

(51) Int. Cl.
*H04R 1/40* (2006.01)
*H04R 3/12* (2006.01)

(52) U.S. Cl.
CPC .... *H04R 2201/401* (2013.01); *H04R 2400/11* (2013.01)

(58) Field of Classification Search
USPC .................................................. 381/335, 386
See application file for complete search history.

(56) References Cited

U.S. PATENT DOCUMENTS

| | | | |
|---|---|---|---|
| 4,357,490 | A | 11/1982 | Dickey |
| 5,537,479 | A | 7/1996 | Kreisel et al. |
| 5,590,214 | A | 12/1996 | Nakamura |
| 5,812,685 | A | 9/1998 | Fujita et al. |
| 6,801,631 | B1 | 10/2004 | North |
| 6,961,438 | B1 | 11/2005 | Fujita |
| 7,275,621 | B1 * | 10/2007 | Delgado, Jr. .......... H04R 1/403 181/150 |
| 7,409,071 | B1 | 8/2008 | Bromer |
| 8,175,304 | B1 * | 5/2012 | North ....................... H04R 5/02 381/89 |
| 9,762,999 | B1 | 9/2017 | Johnson et al. |
| 9,807,481 | B2 * | 10/2017 | O'Keeffe ................ H04W 4/70 |
| 10,149,046 | B2 | 12/2018 | Johnson et al. |
| 10,277,978 | B2 * | 4/2019 | Yeh ...................... H04R 1/2834 |
| 10,334,355 | B2 * | 6/2019 | Johnson ................. H04R 1/323 |
| 10,440,455 | B2 | 10/2019 | Fox |
| 10,805,715 | B2 * | 10/2020 | Alexander ............... H04R 1/26 |
| 10,959,031 | B2 * | 3/2021 | Christoph ................ H04R 1/02 |
| 10,979,810 | B2 * | 4/2021 | Mata Magana .......... H04R 5/02 |
| 11,128,952 | B2 * | 9/2021 | Huang ................. H04R 1/2834 |
| 2004/0240697 | A1 | 12/2004 | Keele |
| 2005/0025319 | A1 | 2/2005 | Kawakami |
| 2006/0153407 | A1 | 7/2006 | Keele et al. |
| 2006/0233402 | A1 | 10/2006 | Inagaki et al. |
| 2007/0201711 | A1 | 8/2007 | Meyer et al. |
| 2008/0285768 | A1 | 11/2008 | Larsen et al. |
| 2009/0238383 | A1 | 9/2009 | Meyer et al. |
| 2012/0033834 | A1 | 2/2012 | Mellow et al. |
| 2016/0205479 | A1 | 7/2016 | Tomar |
| 2020/0213694 | A1 | 7/2020 | Kwiram |

OTHER PUBLICATIONS

English machine translation of JP4513765.
English machine translation of KR100836662.

* cited by examiner

AUDIO LOUDSPEAKER ARRAY AND RELATED METHODS

This application claims the benefit of U.S. Provisional Patent Application No. 63/093,451, filed Oct. 19, 2020, the disclosure of which is incorporated herein by reference.

TECHNICAL FIELD

This document relates generally to high fidelity sound reproduction arts, and more specifically to a high fidelity sound reproduction system and audio loudspeaker array designed to improve the fidelity, or exactness, of the reproduced sound such that a plurality of listeners in a room each perceive they are listening in a listening sweet spot.

BACKGROUND

High fidelity sound reproduction or a high fidelity experience is particularly desirable for audiophiles listening to a recording. In the case of listening to a recording by a few individuals, it has traditionally been acceptable to have a listening sweet spot in a listening space wherein imaging of the sound is particularly vivid. The sweet spot is typically the size of a single chair positioned directly in front of a high-end audio speaker, i.e., on-axis, where the music is accurately reproduced for the listener. The term on-axis is defined herein as an axis extending substantially perpendicular to a face of a driver as best exemplified in FIG. 2. In the case of many listeners in a room, however, not all of the listeners can occupy the on-axis sweet spot. As a result, off-axis imaging increases in importance. While good on-axis performance is the norm in high end audio speakers, such performance is difficult to achieve with known speaker arrays.

A key element of audio loudspeakers is the transducer, commonly called a driver, which is a device whose movement causes changes in sound pressure that reproduces the desired music or sound. Typical transducers used in high fidelity loudspeakers are illustrated in Table 1.

TABLE 1

| Transducer Type | Typical Frequency Range | Size and Cost |
|---|---|---|
| Piston Driver | Low (sub), mid, and high | Moderate size and low cost in mid frequency range. Subwoofer drivers can be large and expensive |
| Compression Driver | Mid and High (tweeter) | Typically, small and moderate cost |
| Planar/Ribbon | High, down to mid | Large and expensive for both mid & high frequencies. Smaller and less expensive for high frequencies only. |
| Electrostatic | Mid and High | Most expensive transducer. Can be extended down to low frequency with considerable size and cost. |

As is known in the art, a typical driver has a voice coil and magnet, which act together when an electrical signal is applied to make a cone, or diaphragm, move back and forth causing sound pressure or sonic waves. The voice coil and magnet may be referred to collectively as a motor assembly. Each of these noted components is typically supported by a basket. The driver has two faces. A front or radiating face is open to the listening space and serves the purpose of radiating sound waves to a listener's ear. This configuration is referred to throughout the specification as forward facing.

A back face is typically enclosed by an air space chamber in order to obtain a desired frequency response. The motor assembly is located on the backside of the driver. The common phrase used to describe the function of the air space chamber is that it loads the driver. In other words, the air space chamber is a loading chamber. In an alternative configuration, the driver may be supported such that the back face opens to the listening space radiating sound waves to the listener's ear. This configuration is referred to throughout the specification as rearward facing.

The loading chamber can be either sealed or ported, horn/scoop loaded, or loaded in a transmission line. When sealed, the back face does not directly contribute to the sound waves heard by the listener. When ported, air mass in the port or mass in a drone cone resonates with the driver at a specific frequency. When loaded in a transmission line or horn, low frequency sound waves are typically allowed to escape the loading chamber into the listening space through an opening in the loading chamber, often at a lower frequency than the sound waves transmitted to the listener directly from the front of the source. Since ports produce sound waves at lower frequencies and with unique coloration, i.e., addition of tones or alteration of original tones, ports are considered to be a separate sound source. Together, the driver and its loading chamber are called a loudspeaker.

Conventional audio loudspeaker designs attempt to achieve high fidelity sound reproduction through one of two approaches: (1) utilization of a combination of more than one transducer type or size where each transducer serves a distinct range of frequencies; or (2) utilization of a specialized transducer that is capable of serving an entire range of listening frequencies.

The most common high fidelity audio loudspeaker approach, approach (1), utilizes a combination of more than one transducer type or size. For example, a large piston driver will serve the lowest frequencies (subwoofer) (e.g., typically plays no higher than 80 Hz, but can play up to 250 Hz in certain designs), a smaller piston driver will serve the midrange frequencies, and yet a smaller driver will serve the highest frequencies (tweeter). In some combinations, the tweeter will be a compression driver such as in pro-audio applications where high sound pressure levels (SPL) at low cost is desirable. A typical sound reproduction system in the pro-audio market to cover the entire frequency range may utilize a loudspeaker having a subwoofer ported so that even lower frequencies can be achieved, and may port a midrange driver too to bridge the frequency gap between the subwoofer and the midrange. In such a loudspeaker, the listener has sound coming from five different sound sources over the frequency range from lowest to highest, including: (1) a subwoofer port; (2) a subwoofer; (3) a midrange port; (4) a midrange; and (5) a tweeter.

In a high fidelity sound reproduction system where less emphasis is placed on obtaining high SPL at low cost, and more emphasis is placed on sound quality, one or both ports in the combination described above may be eliminated. Without the subwoofer and midrange ports, the listener has sound coming from only three different sound sources over the frequency range from lowest to highest, including: (1) a subwoofer (2) a midrange; and (3) a tweeter.

Regardless of approach, it is a very difficult task to achieve fidelity high enough across so many different sound sources to recreate an image of a sound stage. Each sound source serves its purpose well in its assigned frequency range, but there is sonic confusion injected by different sound source types over the entire listening range, wherein sonic confusion is a lack of fidelity. Considering that music "notes" are comprised of multiple frequencies including a fundamental frequency and harmonic frequencies, it is often the case that a single musical note could be reproduced over two or three different sound sources in a sound reproduction system with multiple sound sources as described above.

Despite considerable discussion in the literature on how to make SPL nearly constant over a listening range when multiple types of sound sources are used, cost effective approaches to dealing with the sonic confusion created by the inherently different sound generation sources with high fidelity performance are scarce at best.

One variant to using piston or compression drivers for the high frequencies, generally described in the exemplary most common approach above, is the use of a ribbon driver, which claims to have superior sound creation. However, ribbon drivers are incapable of producing frequencies at the lowest end of the frequency range and thus must be paired with another sound source, for example, a piston subwoofer.

One example of the second approach, approach (2), to eliminating the different sound source types or sizes relies on the utilization of a large electrostatic transducer. While such a device can serve all frequency ranges, its high cost and large size limits its use. A smaller and less expensive version utilizes an electrostatic transducer for mid to high frequency ranges but incorporates a piston driver subwoofer to handle the low frequencies. Such a system is still very expensive relative to piston, compression, and even ribbon drivers due to the nature of electrostatic transducers and still requires use of different sound source types.

Yet another example of the second approach is a specialized piston driver. Due to the specifications that the single piston driver must satisfy, including serving all frequency ranges, it is very expensive, sometimes costing more than a complete system of different drive types.

Whether utilizing approach (1) with multiple transducer types or sizes, or approach (2) with a single transducer to achieve high fidelity sound reproduction, the high fidelity speaker industry has adopted a flat surface theory which predominantly teaches that a flat surface is the best means of achieving high fidelity. In fact, the touted advantage of the ribbon transducer and the electrostatic transducer is that they are flat, as opposed to the cone shape of a piston driver. The flat surface theory is that a flat transducer produces a coherent sonic waveform. This approach is so indoctrinated into speaker design that even multiple transducer speakers have the transducers positioned in a single plane so as to approximate a flat surface.

Even the pro-audio market has adopted the flat surface theory for improved sonic performance and has economically implemented it with arrays of transducers. As noted above, the need for low cost and high SPL is more important in the pro-audio market than in the high-fidelity market. Therefore, an array of standard transducers is a good method to achieve both relatively high output and low cost.

One such array is a column array wherein a number of transducers are stacked vertically and in the same plane. In other words, each of the transducers is supported at the same angle to a plane in the listening space. The spacing between transducers is minimized so that the effect of comb filtering is minimized; otherwise at high frequencies the output from one transducer in the array will cancel out the output from a second transducer in the array based on the distance from each transducer to a listening position. Column arrays are 1×N wherein 1 is the number of transducer columns and N is the number of transducer rows.

A second type of array is a line array which is often comprised of at least one midrange column(s) and a tweeter column. The number of transducers used in the midrange column may be different than the number in the tweeter column. Again, when used within a line array, the individual line arrays are 1×N. When two midrange columns are used in a line array, a typical configuration is mid-tweeter-mid.

Due to both the need to cover the listening space and the human ear's ability to better discern differences between a horizontal array and a vertical array, pro-audio arrays are predominantly vertical. Vertical array(s) can be sized and aimed to cover an entire listening space (e.g., all of an audience in a given venue). One modification to the flat, vertical line array is a J-array where a lower elevation of the J-array is formed into an arc to better cover the listening space or audience. Often the J-array is formed using modular units of arrays arranged in an arc instead of individual transducers being arranged in an arc. Again, the purpose of the arc shape of the lower elevation is to improve sound dispersion, which means to better cover the listening space or audience with a more consistent SPL. The arc formation does not, however, improve the sound quality for any listener.

Line arrays used in pro-audio applications offer some improved sonic performance relative to a single driver due to the averaging of distortion from many drivers. As a result, distortion from any one driver is masked to the degree that each driver has its own distortion signature and not a common distortion shared with all the other drivers. This improvement in sonic performance, however, is insufficient to meet the imaging requirement necessary for the listener to perceive the recording sounds like a live performance. For live sound imaging, the loudspeaker system should substantially reproduce in three dimensions the location of sound sources. A good live sound imaging system, for example, will sound like a lead singer is closer to the listener than the drummer who is located behind the lead singer.

When an array of radiating drivers is being discussed, it is important to understand whether the drivers are operating in common acoustic phase or in opposing acoustic phase. Acoustic phase is in reference to the polarity of the sound pressure wave radiating into a listening space where the sound is received by a listener and is a combination of both mechanical and electrical phase of the drivers. For the drivers to operating in common acoustic phase, the drivers must face the same way and be wired with the same polarity or the drives may face opposite one another and be wired with opposite polarity.

As described above, one limitation of conventional audio speaker array designs is their inability to produce on-axis performance, while providing off-axis performance, similar to that produced by high end audio speakers. Accordingly, a need exists in the loudspeaker industry for a high fidelity audio speaker array capable of on-axis, or single chair sweet spot, performance coupled with off-axis performance that creates the benefit of a whole listening room being the listening sweet spot. The whole room sweet spot is advantageous over the industry common single chair sweet spot because it allows listeners to be mobile and/or participate with other listeners who are sharing the experience. The whole room sweet spot can also be described as perceiving a live performance regardless of position in the listening space.

SUMMARY OF THE INVENTION

In accordance with the purposes and benefits described herein, an audio speaker is provided for projecting sound into a listening space having an on-axis and an off-axis. The audio speaker may be broadly described as comprising a frame or manifold supporting at least two drivers radially arrayed in a plane substantially perpendicular to the on-axis.

In another possible embodiment, the at least two drivers are electrically connected to operate in common acoustic phase.

In one other possible embodiment, the at least two drivers are substantially the same size.

In still another possible embodiment, the at least two drivers are each mid-range drivers.

In yet another possible embodiment, the at least two drivers include at least one rearward facing driver.

In an additional possible embodiment, the at least two drivers includes nine drivers including first, second, and third groupings of three drivers electrically connected in series and wherein each of the first, second, and third groupings of three drivers electrically connected in parallel.

In one other additional possible embodiment, the audio speaker further includes an on-axis driver. In this additional embodiment, the at least two drivers are electrically connected to operate in common acoustic phase. Even more, the at least two drivers are substantially the same size. In still another possible embodiment, the at least two drivers are each mid-range drivers and, in yet another, the at least two drivers include at least one rearward facing driver. One other embodiment in this additional embodiment, has the on-axis driver as a high frequency driver or tweeter. In yet another, the at least two drivers are electrically connected to operate in common acoustic phase.

In yet another additional possible embodiment, the audio speaker further includes an inner driver positioned substantially at a point where a first line drawn perpendicularly through a face of a first driver of the at least two drivers and a second line drawn perpendicularly through a face of a second driver of the at least two drivers converge.

In this additional embodiment, the inner driver is on-axis. In another, the inner driver is a high frequency driver or a tweeter. In still another, the at least two drivers are electrically connected to operate in common acoustic phase. In one other, the at least two drivers are substantially the same size. In yet another, the at least two drivers are each mid-range drivers. In one other, the at least two drivers include at least one rearward facing driver. In still another, the at least two drivers includes nine drivers including first, second, and third groupings of three drivers electrically connected in series and wherein each of the first, second, and third groupings of three drivers electrically connected in parallel.

In still yet another additional possible embodiment, the frame is enclosed by an air space chamber. In this additional embodiment, the audio speaker further includes a loading driver positioned within the air space chamber.

In one other additional possible embodiment, the audio speaker further includes an enclosure supporting the frame. In still another, the enclosure further supports a subwoofer.

In accordance with another possible embodiment, an audio speaker for projecting sound into a listening space having an on-axis and an off-axis includes a frame supporting at least two drivers in a plane substantially perpendicular to the on-axis, wherein a first line drawn perpendicularly through a face of a first driver of the at least two drivers and a second line drawn perpendicularly through a face of a second driver of the at least two drivers converge at a point on the on-axis.

In another possible embodiment, the at least two drivers are electrically connected to operate in common acoustic phase.

In yet another possible embodiment, the at least two drivers are substantially the same size.

In still another possible embodiment, the at least two drivers are each mid-range drivers.

In one other possible embodiment, the at least two drivers include at least one rearward facing driver.

In yet one other possible embodiment, the at least two drivers includes nine drivers including first, second, and third groupings of three drivers electrically connected in series and wherein each of the first, second, and third groupings of three drivers electrically connected in parallel.

In yet still another possible embodiment, the audio speaker further includes an inner driver.

In this additional embodiment, the inner driver is supported by the frame at substantially the point on the on-axis. In another, the inner driver is a high frequency driver or a tweeter. In still another, the inner driver is oriented on-axis. In one other, the frame is enclosed by an air space chamber. In still another, the audio speaker further includes a loading driver positioned within the air space chamber and in one other possible embodiment, the audio speaker further includes an enclosure supporting the frame.

In accordance with another possible embodiment, an audio speaker for projecting sound into a listening space having an on-axis and an off-axis includes a frame supporting at least two drivers radially arrayed in a plane and an inner driver having a face substantially parallel to the plane.

In another possible embodiment, the at least two drivers are electrically connected to operate in common acoustic phase.

In yet another possible embodiment, the at least two drivers are substantially the same size.

In still another possible embodiment, the at least two drivers include at least one rearward facing driver.

In one other embodiment, the inner driver is a high frequency driver or a tweeter.

In another possible embodiment, the face of the inner driver is substantially perpendicular to the on-axis.

In still one other possible embodiment, a first line drawn perpendicularly through a face of a first driver of the at least two drivers and a second line drawn perpendicularly through a face of a second driver of the at least two drivers converge at a point on the on-axis.

In the following description, there are shown and described several embodiments of audio speakers. As it should be realized, the audio speakers are capable of other, different embodiments and their several details are capable of modification in various, obvious aspects all without departing from the audio speakers as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the audio speakers and together with the description serve to explain certain principles thereof. In the drawing figures.

Reference will now be made in detail to the present embodiments of the audio speakers, examples of which are illustrated in the accompanying drawing figures, wherein like numerals are used to represent like elements.

DETAILED DESCRIPTION

Figure 1:
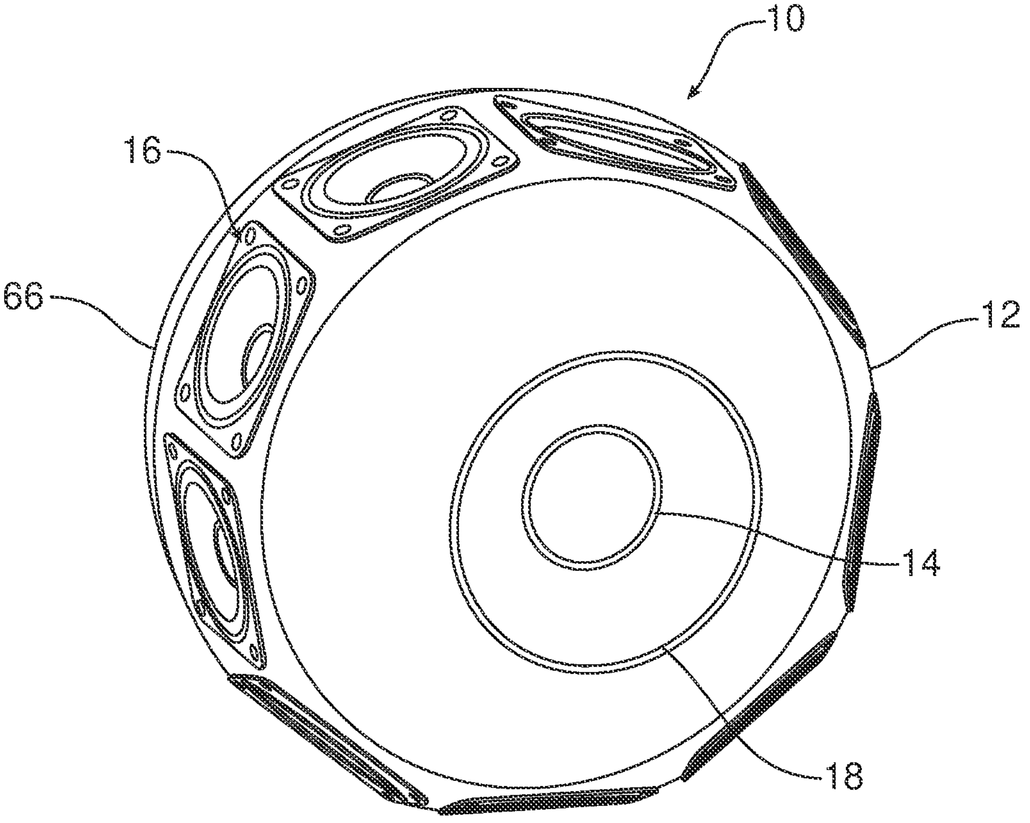
FIG. 1 is a perspective view of an audio speaker array showing a plurality of radially arrayed drivers and an inner driver mounted to a frame.

Reference is now made to FIG. 1 which illustrates one embodiment of an audio speaker array 10. As shown, the described audio speaker array 10, or speaker array, includes a plurality of drivers supported by, or mounted or attached to, a frame or manifold 12 for projecting sound into a listening space having an on-axis and an off-axis. The frame 12 may be made of a wide variety of materials and may take many different shapes. For example, the frame 12 may be disc-shaped with the plurality of drivers mounted or attached thereto. In the described embodiment, the frame 12 is a 3-dimensional printed hemispherical shape. An interior air space of the frame 12 is utilized to load at least some of the plurality of drivers as will be described in more detail below.

The plurality of drivers includes a first or inner driver 14 and an outer group of drivers 16. In the described embodiment, multiple common drivers are utilized in the outer group of drivers which are electrically connected to operate in common acoustic phase. In addition, each of the drivers in the outer group of drivers are the same type and size (e.g., all purchased from the same manufacturer so they will have very similar characteristics) which necessarily minimizes the number of different types of sound sources and improves fidelity. Of course, additional embodiments could utilize different drivers and/or drivers not electrically connected to operate in common acoustic phase but at the expense of the improved fidelity. Moreover, in the embodiments described herein, each of the drivers in the outer group of drivers 16 is a piston driver capable of playing a mid or a full frequency range which also lowers cost.

In the described embodiment, the outer group of drivers 16 contribute sound reproduction many octaves below the inner driver 14. If the outer group of drivers 16 include full-range drivers, in other embodiments, the outer group of drivers would reproduce high frequencies in addition to the high frequencies produced by the inner driver 14. If the outer group of drivers 16 include only mid-range drivers, in yet other embodiments, then the outer group of drivers will have a crossover frequency with the inner driver 14 whereby the inner driver 14 would make the primary contribution in sound reproduction above the crossover frequency. It should be noted that still other embodiments may not include an inner driver. In such embodiments, the plurality of drivers includes only the outer group of drivers 16.

Depending on a diameter of the mid- or full-range drivers implemented in the speaker arrays disclosed herein, the speaker arrays will have an ability to play down to a certain frequency. The larger the diameter of the driver, the lower frequency it can play. The tradeoff with larger drivers, however, is their difficulty in playing higher frequencies. In the described embodiments, the drivers in the outer group of drivers 16 of the speaker arrays are selected to be within a ½" diameter to 4" diameter range. For the most demanding high-fidelity applications where the speaker array is utilizing drivers in the ½" to 4" diameter range playing all the way to the top of the human listening range of 20,000 Hz, it is typical for the speaker array to play down to 100 Hz. If frequencies lower than 100 Hz are required or preferred, then a subwoofer may be added, as described below, to a system to play from 100 Hz down to whatever frequency the listener desired, for example, 20 Hz.

Figure 2:
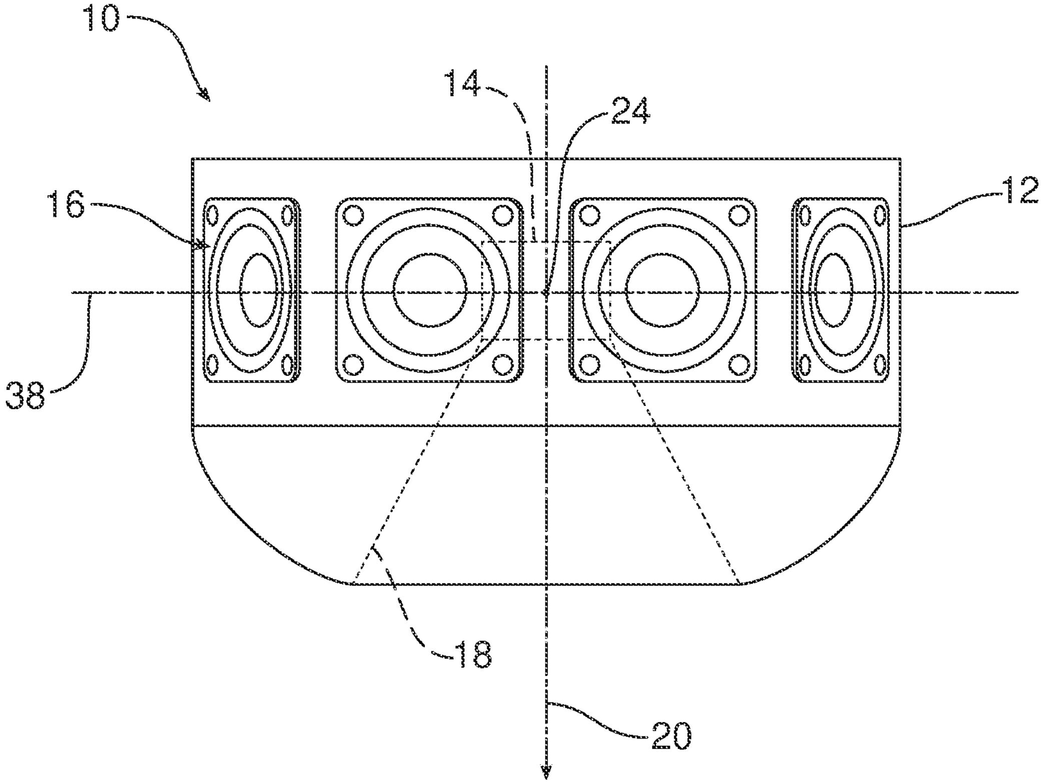
FIG. 2 is a top plan view of the audio speaker array in FIG. 1.

The inner driver 14 in the embodiment shown in FIG. 1 is a higher frequency driver, for example, a tweeter. The inner driver 14 is mounted in a known manner to the frame 12 in a forward facing and generally central manner. A horn 18 or wave guide is integrally 3-dimensionally printed and forms a part of the hemispherical shaped frame 12. In other embodiments, the horn 18 may be printed, molded, or otherwise formed apart from the frame 12 and mounted thereto or a horn may not be utilized at all. Given the manner in which the inner driver 14 is mounted to the frame 12, as shown in FIG. 2, the inner driver 14 primarily contributes sound reproduction along an on-axis 20 due to the inherent directionality of the frequencies it plays. Hence, the inner driver 14 is facing on-axis towards a common single chair sweet spot 22.

Figure 3:
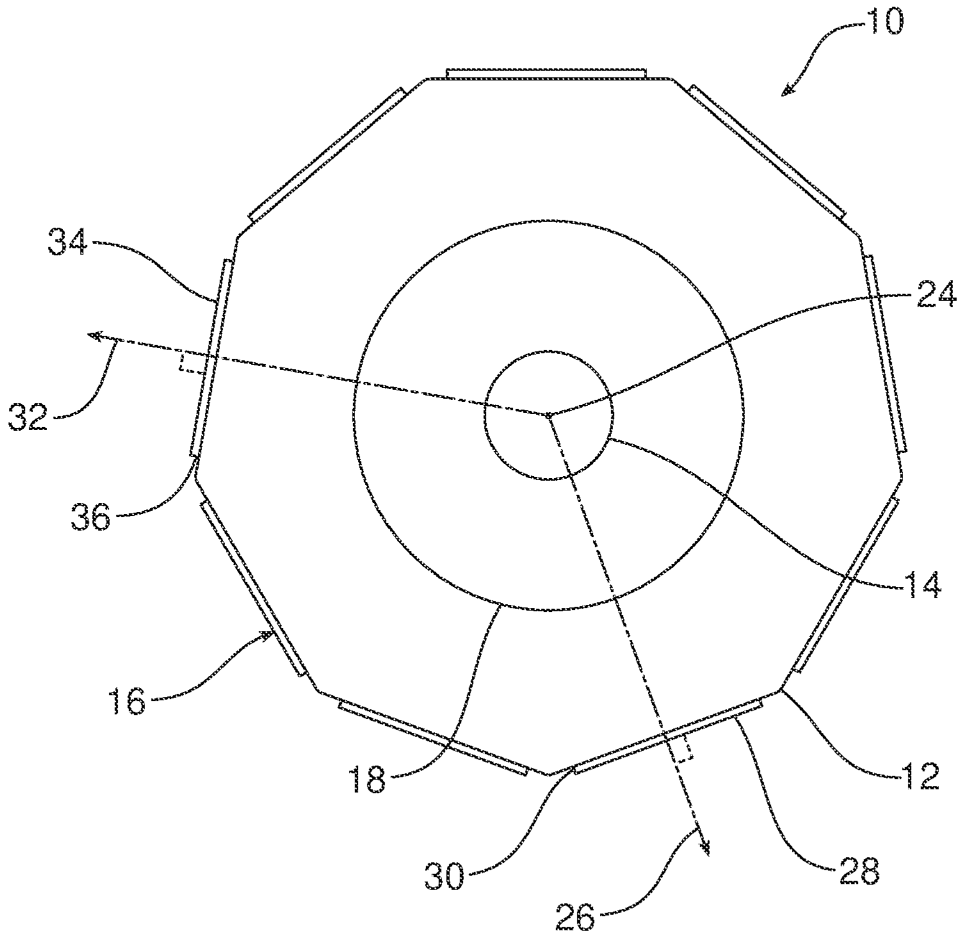
FIG. 3 is a front plan view of the audio speaker in FIG. 1.

In order to achieve time coherency in the listening space with the outer group of drivers 16 in the described embodiment, the inner driver 14 is located at an acoustic center of the outer group of drivers. The acoustic center 24 is approximately the geometric center of the outer group of drivers 16. As shown in FIG. 3, if a first line 26 is drawn generally perpendicularly through a face 28 of a first driver 30 and a second line 32 is drawn generally perpendicularly through a face 34 of a second driver 36 in the outer group of drivers 16, the first and second lines from the drivers in the outer group of drivers will converge essentially at the acoustic or geometric center 24 as shown.

Figure 4:
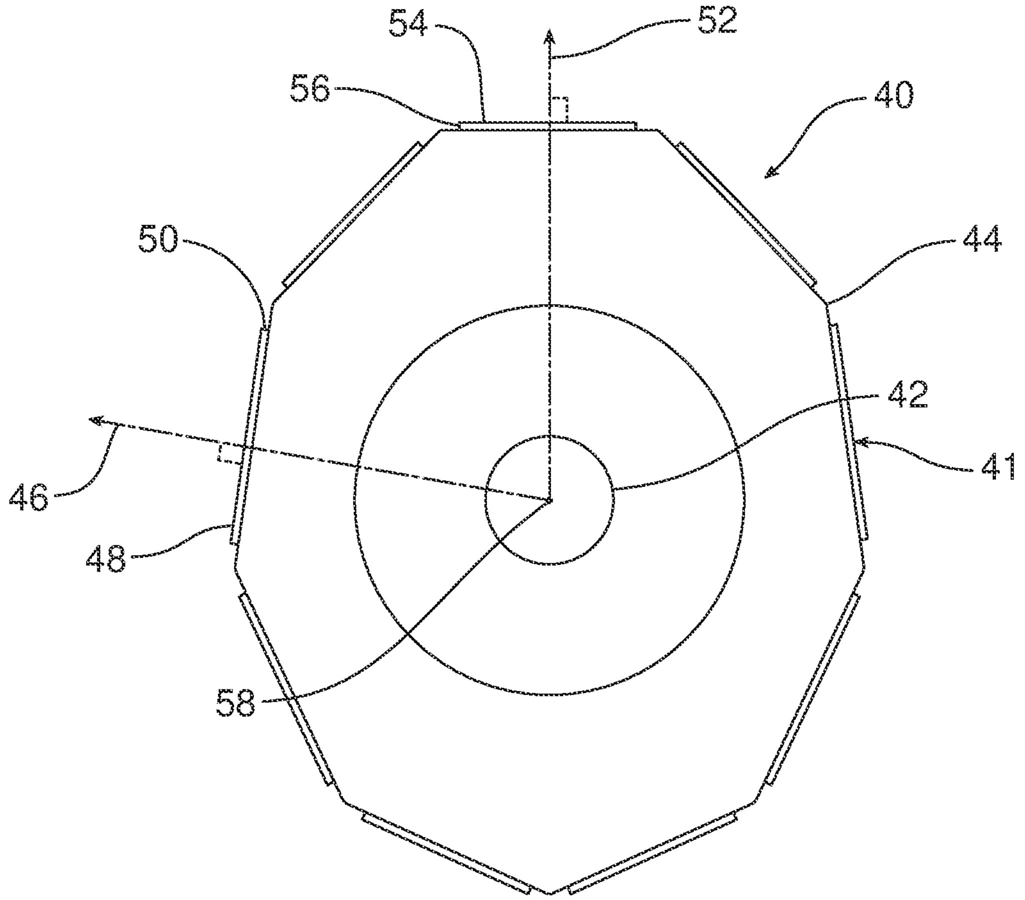
FIG. 4 is a front plan view of an alternate embodiment of an audio speaker array showing a plurality of radially arrayed drivers and an inner driver mounted to a frame.

In the described embodiment, as best shown in FIG. 2, nine drivers form the outer group of drivers 16 and are radially arrayed in a plane (shown as line 38) substantially perpendicular to the on-axis 20. In other words, the outer group of drivers 16 are mounted to the frame 12 in a ring or circular configuration surrounding the inner driver 14 as exemplified in FIG. 3. In other embodiments, an outer group of drivers 41 may be arrayed around an inner driver 42, or no inner driver may be used, in other than a circular or ring type arrangement. In one such speaker array 40 shown in FIG. 4, a frame 44 supports the outer group of drivers in generally an oval shaped configuration. As shown, if a first line 46 is drawn generally perpendicularly through a face 48 of a first driver 50 and a second line 52 is drawn generally perpendicularly through a face 54 of a second driver 56 in the outer group of drivers 40, the first and second lines from the drivers in the outer group of drivers will converge essentially at an acoustic or geometric center 58 as shown.

Figure 5:
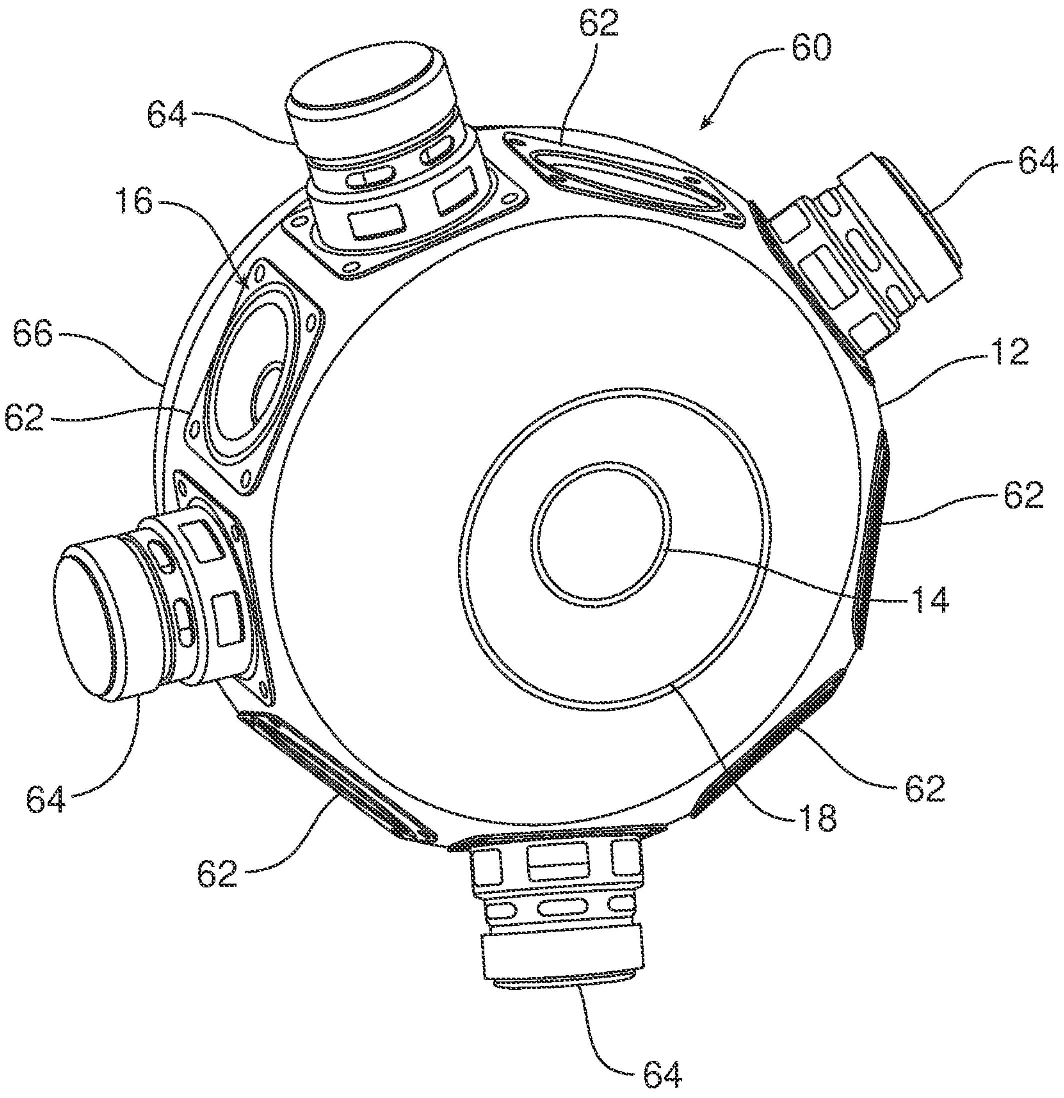
FIG. 5 is a perspective view of an audio speaker array showing a plurality of radially arrayed drivers and an inner driver mounted to a frame with the radially arrayed drivers mounted in an alternating forward and rearward facing manner.

A similar embodiment of a speaker array 60 is shown in FIG. 5. In this embodiment, the speaker array 60 is the same as the speaker array 10 except the nine drivers in the outer group of drivers 16 include five forward facing drivers 62 positioned in an alternating manner with four rearward facing drivers 64. In other words, the drivers alternate between forward and rearward facing along the ring or circle as shown. An arrangement of a sufficient number of drivers around the frame 12 provides for an endless array of sound without boundary artifacts where the array ends and begins. The utilization of nine drivers provides for excellent listening space coverage and a simple and advantageous wiring configuration. Of course, other embodiments may use more or fewer drivers in the outer group of drivers and the inner driver 14 may include more than one driver as well.

Figure 6:
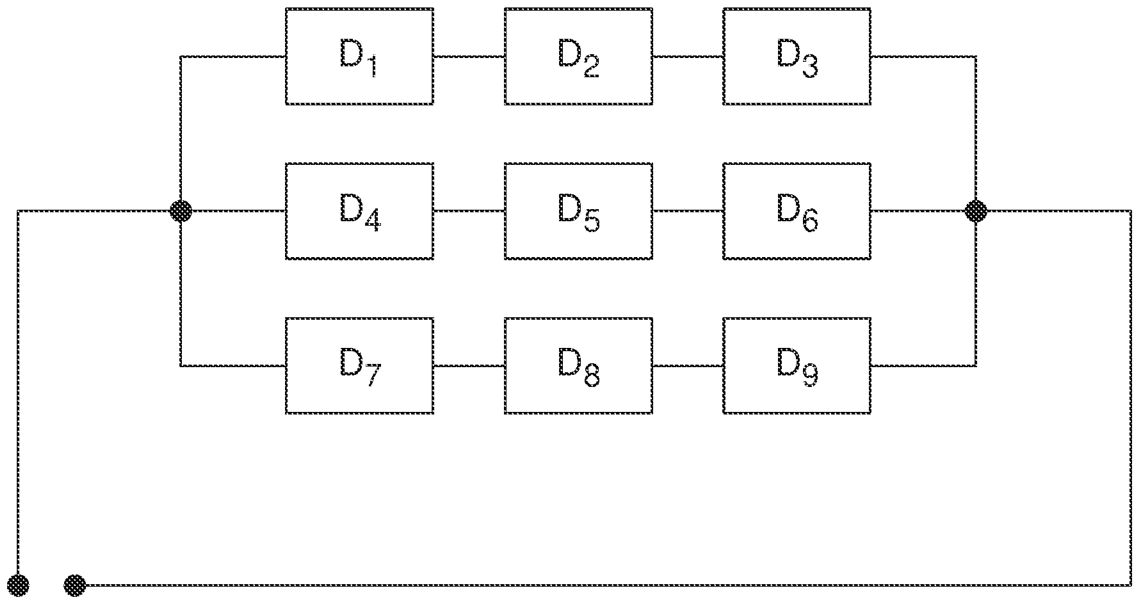
FIG. 6 is a schematic diagram of nine radially arrayed drivers.

As shown in FIG. 6, the nine drivers (labeled D1-D9) are electrically connected such that a first group, including D1, D2, and D3, a second group, including D4, D5, and D6, and a third group, including D7, D8, and D9, each have three drivers connected in series and each of the first, second, and third groups are themselves electrically connected in parallel. This configuration results in an overall impedance being generally the same as that of an individual driver. Hence, if typical 8-ohm drivers are selected for the driver ring, then the overall driver ring impedance is 8 ohms, which is very amplifier friendly. Of course, other electrical connections may be utilized.

As noted above, the outer group of drivers 16 can be comprised of any number of drivers, but two is the smallest practical quantity to allow excellent entire room imaging, i.e., on-axis performance coupled with off-axis performance that creates the benefit of a whole listening room being the listening sweet spot. Further, at least two, if not all, of the outer group of drivers are supported by the frame at a unique angle relative to a plane in the listening space in order to maximize room sweet spot imaging. In other words, at least two of the outer group of drivers should not face in the same direction.

The outer group of drivers 16 can be oriented over a wide range of angles relative to the on-axis inner driver 14. This is because the outer group of drivers 16 are contributing frequencies lower than the inner driver 14 and those frequencies tend to be much less directional. In other words, an on-axis listener will adequately hear the low and mid-range or sub-tweeter frequencies played by the outer group of drivers 16 even though they do not face towards the on-axis listener. Hence, depending on particular parameters of the outer group of drivers 16 and the inner driver 14, the outer group of drivers are optimized at 90 degrees from on-axis.

As is known in the art, a typical driver has a voice coil and magnet, which act together when an electrical signal is applied to make a cone, or diaphragm, move back and forth causing sound pressure waves. Each of these components is typically supported by a driver frame, commonly called a basket. Each driver has two faces. A front or radiating face is typically open to the listening space and serves the purpose of radiating sound waves to the listener's ear. A back face and frame are typically enclosed by an air space chamber in order to obtain a desired frequency response. The common phrase used to describe the function of the air space chamber is that it loads the driver. In other words, the air space chamber is a loading chamber. Although not required, each of the audio speaker embodiments described herein includes a loading chamber 66 which may take any size or shape and may or may not be loaded with an acoustical transducer such as an additional driver.

Figure 7:
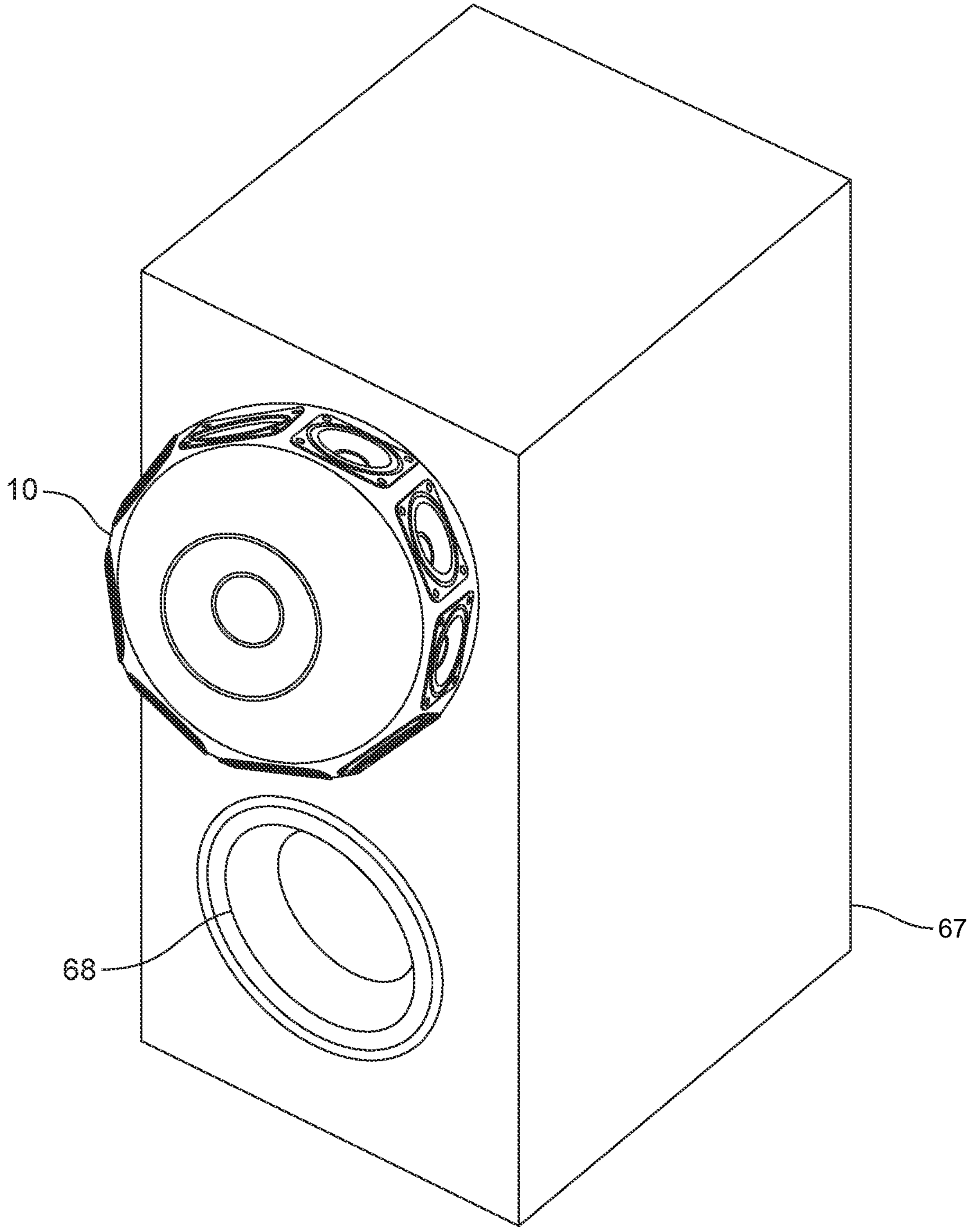
FIG. 7 is a perspective view of an audio speaker array mounted in an enclosure with a subwoofer.

As noted above and shown in FIG. 7, a speaker array 10 may be supported by an enclosure 67 as is known in the art. If frequencies lower than 100 Hz are required or preferred, then a subwoofer 68 may be added and supported by the enclosure 67. In such embodiments, the speaker array 10 may have an enclosed air space chamber or may rely on the air space chamber formed by the enclosure 67. As in other embodiments, the air space chamber is a loading chamber and may or may not be loaded with an acoustical transducer such as an additional driver.

As shown in the embodiment illustrated in FIG. 5, a plurality of drivers 16 can be mounted to a frame 12 in an alternating or varying forward/rearward manner in order to attain an optimal angle for radiating sonic waves into the listening space. Such arrangements, however, are contrary to conventional design philosophy which teaches that a front of mid and high frequency piston drivers must face the listening space or be forward facing as described above. This conventional thought is due to a valid understanding that sound waves become increasingly directional with increasing frequency and therefore positioning the motor assembly of the driver on a front side of the speaker, i.e., the side that radiates sound waves into the listening space, would redirect the sound waves from direct radiation into the listening space. At lower frequencies, however, sound wave travel becomes omnidirectional such that a motor assembly of one driver blocking a direct path of sound from its cone to the listener is relatively insignificant and thus less of a concern.

The foregoing has been presented for purposes of illustration and description. It is not intended to be exhaustive or to limit the embodiments to the precise form disclosed. Obvious modifications and variations are possible in light of the above teachings. For instance, it is important to note that many aspects of the described embodiments may be utilized within a system with digital or all analog components such as with a turn table, tube amplifiers, and passive filter elements such as capacitors and inductors. Utilizing digital control such as with a digital signal processor does allow more control freedom relative to analog control, but many audio purists prefer a complete analog solution. The described embodiments support either.

Figure 8:
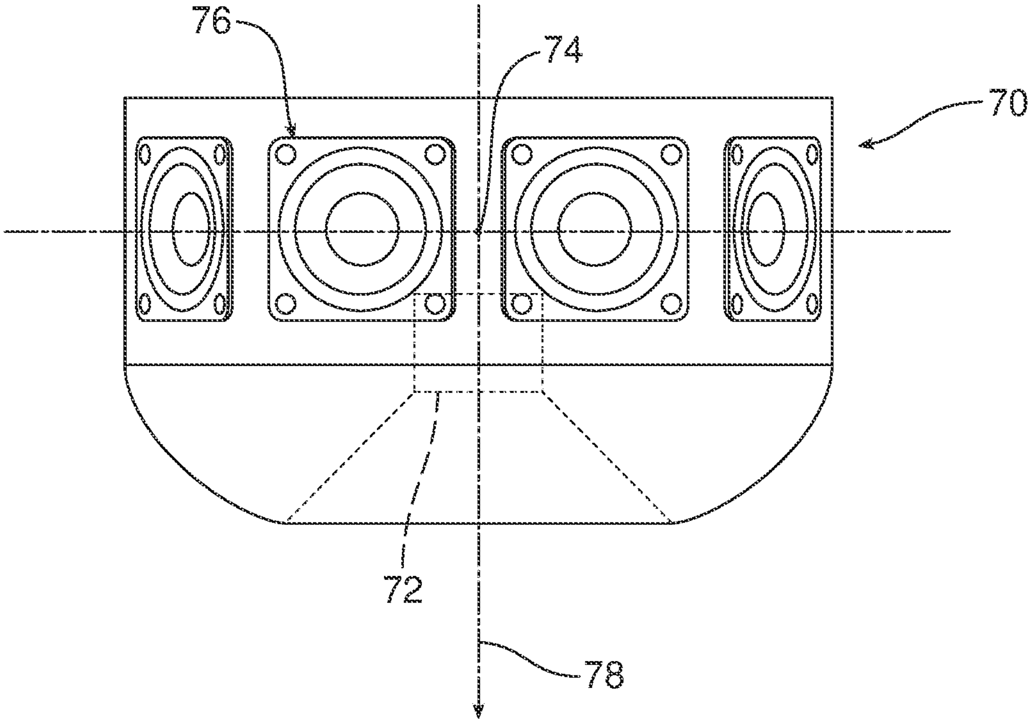
FIG. 8 is a top plan view of an alternate embodiment of an audio speaker array with the inner driver in a different location that the embodiment shown in FIG. 1.

Even more, as show in speaker array 70 in FIG. 8, an inner driver 72 may be located in a position other than an acoustic or geometric center 74 of an outer group of drivers 76. In such embodiments, the inner driver 72 may be translated along an on-axis 78 either toward or away from the listening space. Other embodiments may locate the inner driver 72 at varying locations, including locations off of the on-axis 78, within the outer drivers 76 but at the expense of the improved fidelity. Still other embodiments may have an outer group of drivers mounted greater than or less than 90 degrees from on-axis. If oriented at greater than or less than 90 degrees, the outer group of drivers do not have to be located on the equator of the hemispherical frame. Further, the outer group of drivers do not have to be located on the equator of a hemispherical shaped frame when oriented at 90 degrees from on-axis.

All such modifications and variations are within the scope of the appended claims when interpreted in accordance with the breadth to which they are fairly, legally and equitably entitled.

What is claimed:

1. An audio speaker for projecting sound into a listening space having an on-axis and an off-axis, comprising:

a frame supporting at least two drivers radially arrayed in a plane substantially perpendicular to the on-axis;

an on-axis driver facing substantially on-axis toward a listener at a listening sweet spot; and a waveguide attached to the frame and extending from the on-axis driver substantially along the on-axis whereby sound is directed from the on-axis driver substantially along the on-axis to the listener at the listening sweet spot.

2. The audio speaker of claim 1, wherein the at least two drivers are electrically connected to operate in common acoustic phase.

3. The audio speaker of claim 1, wherein the at least two drivers are substantially the same size.

4. The audio speaker of claim 1, wherein the at least two drivers are each mid-range drivers.

5. The audio speaker of claim 1, wherein the at least two drivers include at least one rearward facing driver.

6. The audio speaker of claim 1, wherein the at least two drivers includes nine drivers including first, second, and third groupings of three drivers electrically connected in series and wherein each of the first, second, and third groupings of three drivers electrically connected in parallel.

7. The audio speaker of claim 1, wherein the on-axis driver is a high frequency driver.

8. The audio speaker of claim 7, wherein the at least two drivers are electrically connected to operate in common acoustic phase.

9. The audio speaker of claim 1, wherein the inner driver positioned substantially at a point where a first line drawn perpendicularly through a face of a first driver of the at least two drivers and a second line drawn perpendicularly through a face of a second driver of the at least two drivers converge.

10. The audio speaker of claim 9, wherein the inner driver is a high frequency driver.

11. The audio speaker of claim 9, wherein the inner driver is a tweeter.

12. The audio speaker of claim 9, wherein the at least two drivers are electrically connected to operate in common acoustic phase.

13. The audio speaker of claim 9, wherein the at least two drivers are substantially the same size.

14. The audio speaker of claim 9, wherein the at least two drivers are each mid-range drivers.

15. The audio speaker of claim 9, wherein the at least two drivers include at least one rearward facing driver.

16. The audio speaker of claim 9, wherein the at least two drivers includes nine drivers including first, second, and third groupings of three drivers electrically connected in series and wherein each of the first, second, and third groupings of three drivers electrically connected in parallel.

17. The audio speaker of claim 1, wherein the frame is enclosed by an air space chamber.

18. The audio speaker of claim 17, further comprising a loading driver positioned within the air space chamber.

19. The audio speaker of claim 1, further comprising an enclosure supporting the frame.

20. The audio speaker of claim 19, wherein the enclosure further supports a subwoofer.

21. An audio speaker for projecting sound into a listening space having an on-axis and an off-axis, comprising:

a frame supporting at least two drivers in a plane substantially perpendicular to the on-axis, wherein a first line drawn perpendicularly through a face of a first driver of the at least two drivers and a second line drawn perpendicularly through a face of a second driver of the at least two drivers converge at a point on the on-axis;

an on-axis driver facing substantially on-axis toward a listener at a listening sweet spot; and a waveguide attached to the frame and extending from the on axis driver substantially along the on-axis whereby sound is directed from the on-axis driver substantially along the on-axis to the listener at the listening sweet spot.

22. The audio speaker of claim 21, wherein the at least two drivers are electrically connected to operate in common acoustic phase.

23. The audio speaker of claim 21, wherein the at least two drivers are substantially the same size.

24. The audio speaker of claim 21, wherein the at least two drivers are each mid-range drivers.

25. The audio speaker of claim 21, wherein the at least two drivers include at least one rearward facing driver.

26. The audio speaker of claim 21, wherein the at least two drivers includes nine drivers including first, second, and third groupings of three drivers electrically connected in series and wherein each of the first, second, and third groupings of three drivers electrically connected in parallel.

27. The audio speaker of claim 21, wherein the inner driver is supported by the frame at substantially the point on the on-axis.

28. The audio speaker of claim 21, wherein the inner driver is a high frequency driver.

29. The audio speaker of claim 21, wherein the inner driver is a tweeter.

30. The audio speaker of claim 21, wherein the inner driver is oriented on-axis.

31. The audio speaker of claim 21, wherein the frame is enclosed by an air space chamber.

32. The audio speaker of claim 31, further comprising a loading driver positioned within the air space chamber.

33. The audio speaker of claim 21, further comprising an enclosure supporting the frame.

* * * * *